United States Patent [19]

Moss

[11] Patent Number: 4,597,835
[45] Date of Patent: Jul. 1, 1986

[54] STILL

[76] Inventor: John Moss, "Sequoia", Gillotts La., Harpsden, Henley-on-Thames, Oxon. RG9 4HP, United Kingdom

[21] Appl. No.: 675,695

[22] Filed: Nov. 28, 1984

[30] Foreign Application Priority Data

Dec. 14, 1983 [GB] United Kingdom ............. 8333299

[51] Int. Cl.$^4$ .......................................... B01D 1/22
[52] U.S. Cl. ................................. 203/89; 202/235; 202/236; 202/238; 159/6.1; 159/49; 159/DIG. 8; 165/88
[58] Field of Search ............... 203/89, 91; 202/235, 202/236, 238, 159, 175, 176, 180; 159/6.1, 49, 15, 28 P, 25 A, DIG. 8, DIG. 42; 165/88

[56] References Cited

U.S. PATENT DOCUMENTS

| | | | |
|---|---|---|---|
| 2,408,639 | 10/1946 | Hickman | 159/6.1 |
| 2,606,146 | 8/1952 | Lutten, Jr. | 159/6.1 |
| 2,721,730 | 10/1955 | Clause et al. | 165/88 |
| 2,734,023 | 2/1956 | Hickman | 159/6.1 |
| 3,092,180 | 6/1963 | Dahlgren | 165/88 |
| 3,200,051 | 8/1965 | Silvern | 203/89 |
| 3,725,209 | 4/1973 | Rosa | 159/6.1 |
| 3,921,709 | 11/1975 | Feres | 159/6.1 |
| 4,017,354 | 4/1977 | Marchenko et al. | 159/6.1 |
| 4,153,500 | 5/1979 | Feres | 159/6.1 |
| 4,167,454 | 9/1979 | Feres | 159/6.1 |
| 4,199,398 | 4/1980 | Erkin et al. | 159/6.1 |
| 4,495,035 | 1/1985 | Swearingen | 203/2 |

FOREIGN PATENT DOCUMENTS

| | | | |
|---|---|---|---|
| 0907657 | 10/1962 | United Kingdom | 159/6.1 |
| 1034757 | 8/1983 | U.S.S.R. | 202/158 |

Primary Examiner—S. Leon Bashore
Assistant Examiner—V. Manoharan
Attorney, Agent, or Firm—Huff & Hanson

[57] ABSTRACT

A still comprises a housing, a hollow rotor rotatably mounted in the housing and having one or more outlets for liquid at the periphery thereof, means for rotating the rotor about its axis, a plurality of concentric lamellar bodies of thermally conductive material mounted in the hollow interior of said rotor so as to provide a labyrinthine path within the rotor for liquid moving radially outwardly under centrifugal force and for vapor moving radially inwardly with respect to the rotor, vaporizing means for vaporizing liquid to be distilled, liquid inlet means for introducing liquid to a radially inner part of the hollow interior of said rotor, vapor outlet means communicating with a radially inner part of the hollow interior of said rotor, and liquid outlet means for removal of liquid from the housing, whereby in use vapor is constrained to move radially inwardly and liquid to move radially outwardly under centrifugal force within said rotor, fractionation occurring at least in part by condensation of vapor on the radially outer surfaces of said lamellar bodies and by evaporation from liquid on the radially inner surfaces of said lamellar bodies, the heat of condensation being conducted through said lamellar bodies from the outer surfaces thereof to provide heat of evaporation at the inner surfaces thereof.

13 Claims, 12 Drawing Figures

(PRIOR ART)

STILL

This invention relates to a still or distillation apparatus and to a distillation process.

A still can be used for the total or partial separation of two or more components in a liquid mixture by boiling of the liquid, condensation of the vapours and countercurrent passage of the gaseous and liquid streams between these two operations. Such operations in a variety of forms of still are well known and generally rely for the substantial or partial separation of the components on intimate countercurrent contact of the vapour and liquid streams and exchange of the components across the vapour-liquid interface by gaseous and liquid diffusion processes.

Conventional stills are generally constructed as tall stationary columns. These may contain a packing designed to promote intimate vapour-liquid contact between vapour ascending the column and condensed liquid running back down the column. Alternatively they may be provided with a number of horizontal trays or plates provided with so-called bubble caps or similar arrangements designed to promote good vapour-liquid contact between liquid on the tray or plate and vapour passing up the column. Particularly if the components to be separated have boiling points that are close to one another a very tall column (sometimes in excess of 50 meters high) or a number of smaller columns may have to be used. This can give rise to problems where space is at a premium or it is impracticable to use a very tall column, as for example on an off-shore oil rig.

It has been proposed to effect distillation in a still comprising a rotor containing an interfacial element which has an interfacial area of more than $1500 \text{ m}^{-1}$, is permeable to the fluids and has pores which present a tortuous path to the vapour and liquid phases. This rotor is rotated at high speed so as to subject the phases to an acceleration of at least $300 \text{ m sec}^{-2}$ as they flow through the element. Such a still is described in U.S. Pat. No. 4,283,255. However, it relies for its operation upon vapour-liquid contact and exchange occurring by a droplet-vapour exchange mechanism. Moreover as the interfacial element has a large number of small passages therethrough it is prone to blockage if the liquid to be distilled contains particulate matter or waxy or solid components, e.g. crude oil.

The present invention accordingly seeks to provide an improved form of still of compact form which is less prone to blockage than the still of the afore-mentioned U.S. Patent and has high separation efficiency.

According to the present invention there is provided a still comprising a housing, a hollow rotor rotatably mounted in the housing and having one or more outlets for liquid at the periphery thereof, means for rotating the rotor about its axis, a plurality of concentric lamellar bodies of thermally conductive material mounted in the hollow interior of said rotor so as to provide a labyrinthine path within the rotor for liquid moving radially outwardly under centrifugal force and for vapour moving radially inwardly with respect to the rotor, vaporising means for vaporising liquid to be distilled, liquid inlet means for introducing liquid to a radially inner part of the hollow interior of said rotor, vapour outlet means communicating with a radially inner part of the hollow interior of said rotor, and liquid outlet means for removal of liquid from the housing, whereby in use vapour is constrained to move radially inwardly and liquid to move radially outwardly under centrifugal force within said rotor, fractionation occurring at least in part by condensation of vapour on the radially outer surfaces of said lamellar bodies and by evaporation from liquid on the radially inner surfaces of said lamellar bodies, the heat of condensation being conducted through said lamellar bodies from the outer surfaces thereof to provide heat of evaporation at the inner surfaces thereof.

Preferably the rotor is arranged for rotation about a substantially vertical axis. Typically the diameter of the rotor is from about 0.3 meters to about 3 meters and the ratio of the axial length to the diameter of the rotor is from about 2:1 to about 1:20.

In one form of the invention the lamellar bodies comprise concentric frusto-conical elements mounted within said rotor. Such lamellar bodies may comprise two sets of concentric frusto-conical elements arranged with the direction of tapering being alternately in opposite directions. Preferably the angle between the axis of each frusto-conical element and its generator is substantially the same. Typically this angle is from about 15° to about 60°, e.g. about 45°. In one arrangement one set of plates is attached to the top of the rotor and the other set to the bottom of the rotor.

Alternatively the lamellar bodies may comprise concentric perforated elements mounted within said rotor. In this arrangement the perforated elements may extend from the top plate to the bottom plate of the rotor. Preferably said perforated elements are formed with circumferential corrugations.

The invention also contemplates use of lamellar bodies in the form of concentric cylindrical elements mounted within said rotor. Such elements may be arranged alternately in two sets, one fixed to the top of the rotor and the other set being fixed to the bottom of the rotor.

The lamellar bodies are made of thermally conductive material, typically a metal or alloy such as stainless steel, carbon steel or copper. The thickness of the lamellar bodies should be sufficient to provide the necessary rigidity under operating conditions but thin enough to permit high thermal flux from one face to another. Preferably the lamellar bodies are less than about 1 mm thick if made of stainless steel, less than about 2 mm thick if made of carbon steel, and less than about 5 mm thick if made of copper.

The still may further include annular boiler means adjacent the radially outermost lamellar body, annular condenser means adjacent the radially innermost lamellar body, means for supplying heating medium to the boiler means, and means for supplying coolant to said condenser means.

Desirably labyrinthine sealing means are provided between the upper and lower faces of the rotor respectively and the housing to prevent substantial vapour and/or liquid flow around the rotor in a radial direction.

The lamellar bodies are preferably arranged within the rotor so that the pressure drop from one body to the next is not excessive. Typically, for a still operating at or near 1 bar the pressure drop from one body to the next lies in the range of from about $10^{-3}$ bar to about 0.2 bar. The pressure drop across each lamellar body may be the same for all the lamellar bodies or may vary from one lamellar body to another.

The invention further provides a distillation process for separating lighter and heavier components of a liquid mixture which comprises:

(a) supplying the liquid mixture to a radially inner part of the interior of a hollow rotor arranged for rotation about its axis and having a plurality of concentric lamellar bodies of thermally conductive material mounted in the hollow interior thereof so as to provide a labyrinthine path within said rotor for liquid moving radially outwardly and for vapour moving radially inwardly with respect to said rotor;

(b) rotating said rotor about its axis;

(c) providing vapour at a radially outer part of the hollow interior of said rotor;

(d) allowing liquid to move radially outwardly with respect to said rotor along said labyrinthine path and to undergo evaporation on the radially inner surfaces of said lamellar bodies;

(e) allowing vapour to move radially inwardly with respect to said rotor along said labyrinthine path and to condense on the radially outer surfaces of said lamellar bodies;

(f) permitting heat of condensation to be conducted through said lamellar bodies from the radially outer surfaces thereof to provide heat of evaporation at the corresponding radially inner surfaces thereof;

(g) allowing vapour enriched in lighter component or components to exit the interior of said rotor from a radially inner part thereof;

(h) recovering vapour of step (g);

(i) allowing liquid enriched in heavier component or components to exit said rotor at the periphery thereof; and (j) recovering liquid of step (i).

The still of the present invention differs substantially in its operation from conventional distilation methods in that the exchange of components between the gaseous and liquid countercurrent streams does not substantially occur by means of intimate contact and diffusion but by the condensation of components from the vapour stream on one side of an impermeable thermally conductive membrane or plate and the evaporation of components from the liquid stream on the other side of the separating membrane. This process is repeated in several countercurrent stages with the evaporated and condensed components at each stage being mixed in with the main countercurrent vapour and liquid streams. Some separation of the components may also take place in the still by the conventional diffusion processes in the regions where intimate countercurrent contact of the vapour and liquid streams occurs, but this is coincidental and of relatively minor assistance to the operation of the still and is not the main mechanism for separating the components.

The separating and throughput capacity of the still depends directly on the heat flux across the separating membrane or plate which in turn is a function of the temperature difference between the condensing vapour and the evaporating liquid and the overall heat transfer coefficient from the condensing vapour to the evaporating liquid. Suitably high heat fluxes are obtained by rapidly rotating the body of the still containing the plates thereby generating a high centrifugal force and by constructing the separating membrane or plate from a relatively thin sheet of a highly conductive material. It has been known for some time that very high overall heat transfer coefficients, well in excess of 1,400,000k cal/m$^2°$ C. can be obtained for a condensing vapour and a boiling liquid under the effects of centrifugal force (see, for example, an article by K. C. D. Hickman in Industrial and Engineering Chemistry (1957), 49, at page 786).

In order that the invention may be clearly understood and readily carried into effect some preferred embodiments thereof will now be described, by way of example only, with reference to the accompanying diagrammatic drawings, wherein:

FIG. 2 is a vertical section on an enlarged scale through part of the rotor of the still of FIG. 1; FIGS. 1 and 2 operating under total reflux;

FIG. 3 is a flowsheet of the still of

Figure 1:
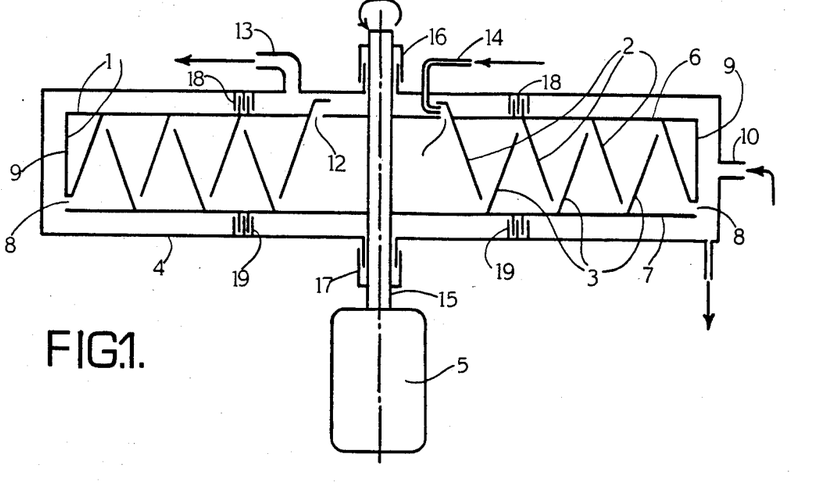
FIG. 1 is a vertical section through part of a still constructed according to the invention.
Figure 2:
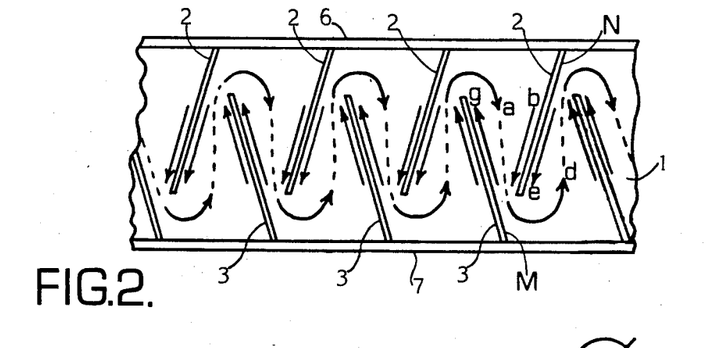
Figure 3:
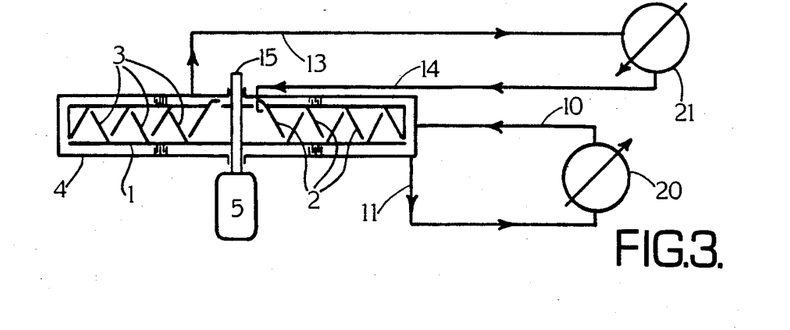

Referring first to FIGS. 1 to 3 of the drawings, a first form of still constructed according to the invention comprises a cylindrical rotor 1, whose axial length is significantly less than its radius, in which is mounted a series of concentric truncated conical membranes or plates 2, 3. As can be seen clearly from FIG. 1, there are two sets of plates 2, 3 which taper in opposite directions. Rotor 1 is mounted in housing 4 and can be rotated at high speed (e.g. about 300 to about 5000 rpm) about its axis by means of motor 5. Plates 2 are secured to the upper wall 6 of rotor 1, whilst plates 3 are similarly secured to the bottom wall 7 of rotor 1. A series of orifices 8 are formed in the outer wall 9 of rotor 1 for the ingress of vapour and egress of liquid. Vapour is fed to housing 4 from a reboiler (not shown in FIG. 1) by way of vapour inlet 10, whilst liquid can be removed from housing 4 for return to the reboiler by means of liquid outlet 11. Vapour and liquid pass radially in countercurrent, in operation of the still, through rotor 1, the liquid moving outwardly whilst the vapour moves radially inwardly. Typically the liquid and vapour are subjected to an acceleration of at least 300 m sec$^{-2}$ by rotation of rotor 1. The plates 2, 3 define a labyrinthine path for vapour as it passes radially towards the axis of rotor 1, as well as for liquid as this moves radially outwardly under the centrifugal force caused by rotation of rotor 1. Vapour escapes from the interior of rotor 1 by way of orifices 12 and vapour outlet line 13 and is passed to a condenser (not shown). A liquid reflux stream is returned from the condenser by way of liquid inlet line 14 and orifice 12.

Shaft 15 is provided with seal members 16 and 17 which co-operate with corresponding members on the housing 4. Labyrinthine seals 18, 19 are also provided between the rotor 1 and the housing 4 so as to constrain at least a major part of the vapour to flow through rotor 1, rather than around it.

In FIG. 2 there is shown part of the rotor 1, on an enlarged scale. As illustrated, plate N is the radially innermost of the plates 2 that are shown and the axis lies to the right of and outside FIG. 2. In operation, vapour travelling radially inwardly of the rotor 1 comes into contact with the cooler plate N and some of it is condensed to form liquid. This liquid passes, under the action of centrifugal force, along the face of the plate N until it is flung from the radially outer lip of the plate and impinges on plate M.

The latent heat released by the condensation of the liquid b is conducted through the plate N and evaporates some of the cooler liquid e flowing on the other side of the plate N.

The net effect of the subsequent condensations and evaporations on each plate is that the vapour d passing the lip of plate N is richer in its more volatile components than the vapour a passing the lip of plate M. Also the liquid g leaving the lip of plate M is leaner in its more volatile components than the liquid e leaving the lip of plate N. The overall and cumulative effect throughout the still of these changes is that more or less partial rectification of the mixture occurs, the concentration of volatile components in the radially inner part of the rotor 1 of the still being substantially greater than those at the periphery thereof.

FIG. 3 illustrates operation of the still of FIGS. 1 and 2 under total reflux. Liquid passes from housing 4 in line 11 to boiler 20 and is returned to housing 4 by way of line 10. Vapour exiting housing 4 in line 13 passes to condenser 21, whence condensed vapour is recycled in line 14.

Figure 4:
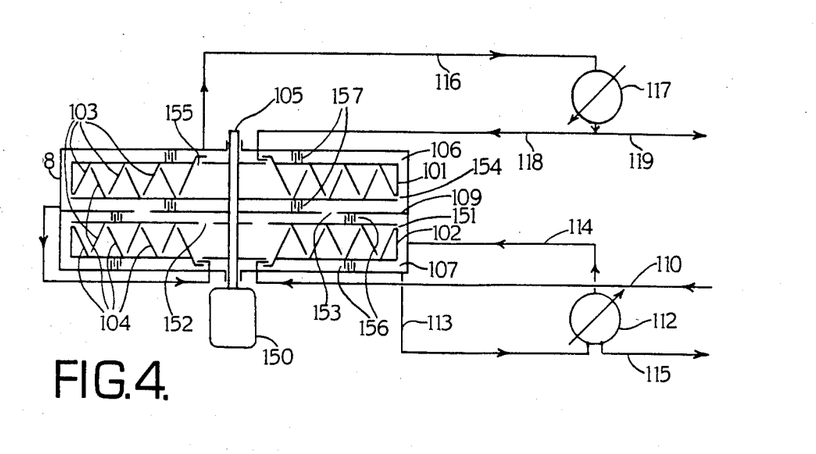
FIG. 4 is a flowsheet of a still according to the invention operating continuously to separate a mixed feed into two products, one rich in more volatile components and the other rich in less volatile components.
Figure 5:
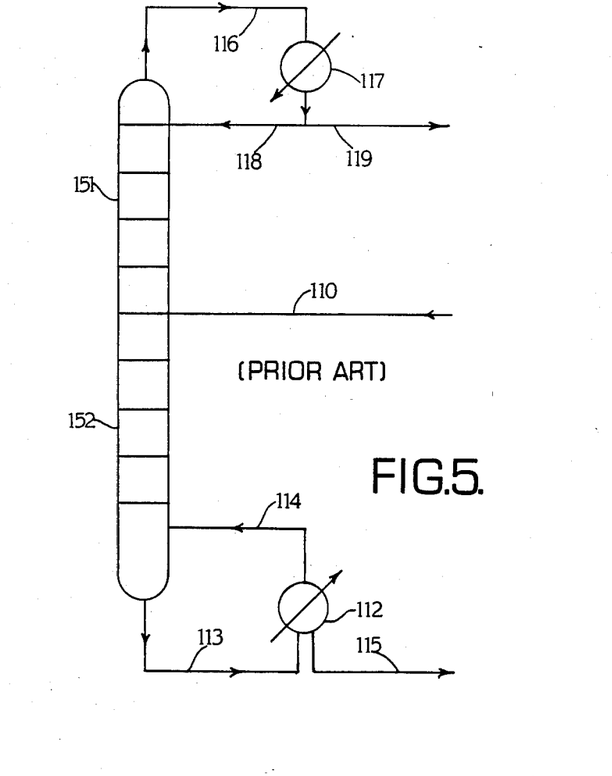
FIG. 5 is a flowsheet of a conventional still under continuous operating conditions.

One possible scheme for the continuous operation of the still to effect a substantial separation of a mixture of two substances with differing volatilities is illustrated in FIG. 4. In this particular scheme two rotors 101, 102, each similar in construction to the rotor 1 of the still of FIGS. 1 and 2, containing a number of concentric conical plates 103, 104 and mounted on the same shaft 105 attached to a motor 150, are operated in series in terms of the countercurrent vapour and liquid flows. In their effect the two rotors 101, 102 act as the upper and lower sections of a conventional distillation column as illustrated in FIG. 5. Each rotor 101, 102 is mounted for rotation within, and is sealed within, a respective compartment 106, 107 of the housing 108, the two compartments 106, 107 being separated one from another by member 109. A liquid feed mixture, which consists of a mixture of components X and Y, is supplied in line 110 to the centre of the lower rotor 102, to which is also fed liquid flowing out from the periphery of rotor 101 in line 111. From the centre of rotor 102 the liquid passes from concentric plate to plate out to the periphery of rotor 102 and then to the reboiler 112 by way of orifices 151 and line 113. Part of the liquid stream fed to the reboiler 112 is vaporised and returned to the periphery of the lower rotor 102 of the still by way of line 114. This vapour passes through orifices 151 in the periphery of rotor 102 and then over the two sets of plates 103, 104 towards the centre of rotor 102. Vapour exits rotor 102 through orifices 152 and then flows via apertures 153 in member 109 into the housing 106 of upper rotor 101. It enters the hollow interior of upper rotor 101 through peripheral orifices 154 and passes over plates 103, 104 from the periphery to the centre of rotor 101. Vapour exits upper rotor 101 by way of orifices 155. Labyrinthine seals 156, 157 are provided to ensure that leakage of vapour around rotors 101, and 102 is minimised and that the desired vapour flow pattern can be achieved. Heavier product rich in component Y is recovered in line 115. On leaving the centre of rotor 101 by way of line 116 the vapour is condensed to liquid in condenser 117; part of the condensate is returned to the centre of rotor 101 in line 118 and part leaves the still in line 119 as the lighter product rich in component X.

The continuous operation of rotors 101, 102 of the still in this manner is analogous to the operation of sections 151, 152 respectively of a conventional vertical bubble cap or sieve tray or packed column as illustrated in FIG. 5 in which analogous flow streams and components are labelled with the same reference numerals as are used in FIG. 4 to facilitate comparison.

Figure 10:
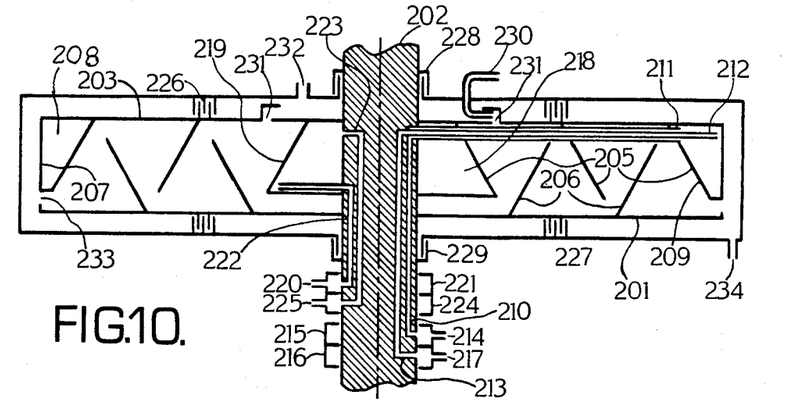
FIG. 10 is a vertical section through a modified form of still.

For ease of presentation the reboiler and condenser in FIG. 4 are shown as separate units. However, these can if preferred be included in very compact manner within the rotors of the still as illustrated in FIG. 10. The centrifugal force which effects the high heat transfer coefficients on the plates 103, 104 also gives high heat transfer coefficients and high capacities for the boiler and condenser units of the still.

Figure 6:
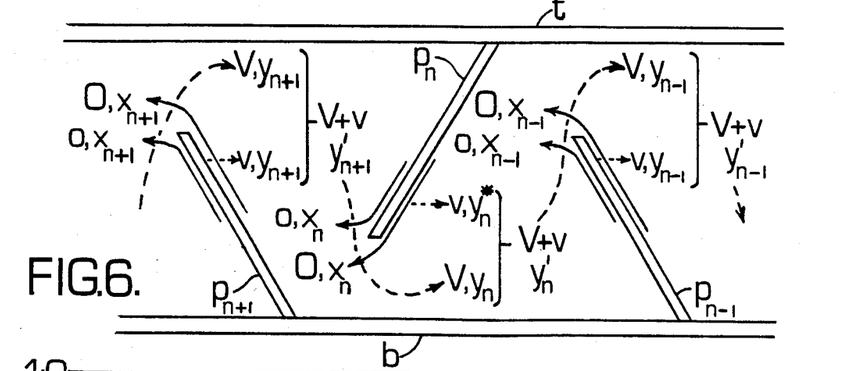
FIG. 6 is a further vertical section through part of the rotor of the still of FIGS. 1 to 3.

In order to more fully explain the operation of the still of FIGS. 1 to 3 and its fractionating or separating capacity and the design factors which must be optimised for any particular application, an analysis of the operation of the still defining the degree of fractionation obtained at each plate and overall for the whole still is now given:

FIG. 6 is a simplified cross-section of part of one form of still constructed according to the invention. This shows part of the (n−1)th, the nth and the (n+1)th plates, counting outwardly from the axis of the rotor, i.e. plates $P_{n-1}$, $P_n$ and $P_{n+1}$ which are mounted between the top plate t and the bottom plate b of the rotor. As drawn, the axis of the rotor is to the right of, and outside of, FIG. 6. The simplifying assumptions that are usually made in distillation calculations are now used, i.e. equal molal latent heats, constant molal liquid overflow and constant molal vapour flow. The following nomenclature is used in FIGS. 6 to 9:

S = feed rate mols/hr
T = distillate mols/hr
W = bottoms mols/hr
V = mols/hr vapour passing each plate
0 = mols/hr liquid passing each plate
R = reflux ratio = O/T
v = mols/hr vapour evaporated on each plate
l = mols/hr liquid condensed on each plate
x = mol fraction of key component in liquid
y = mol fraction of key component in vapour
y* = composition of vapour in equilibrium with liquid of composition x
x* = composition of liquid in equilibrium with vapour of composition y
y' = composition of vapour composed of v mols of composition y* and V mols of composition y.

Then taking a heat balance across the metal of each plate gives:

$$o = v$$

Taking a mass balance on the vapour V and liquid 0 passing each plate $P_{n-1}$, $P_n$, $P_{n+1}$ in a similar way to that for a conventional column, gives the slope of the operating line as O/V. The operating line is that line on which the values for the vapour composition $x_n$ and liquid composition $y_n$ of each plate lie. The vapour liquid equilibrium diagram and the still operating line have been plotted in FIG. 7, being the line passing through points H, F and B and that passing through points K, A and G respectively.

In order to simplify the analysis it is assumed that the fraction of the vapour condensed on each plate is constant throughout the still, i.e. $v/v = a$ constant, i.e. r.

Figure 7:
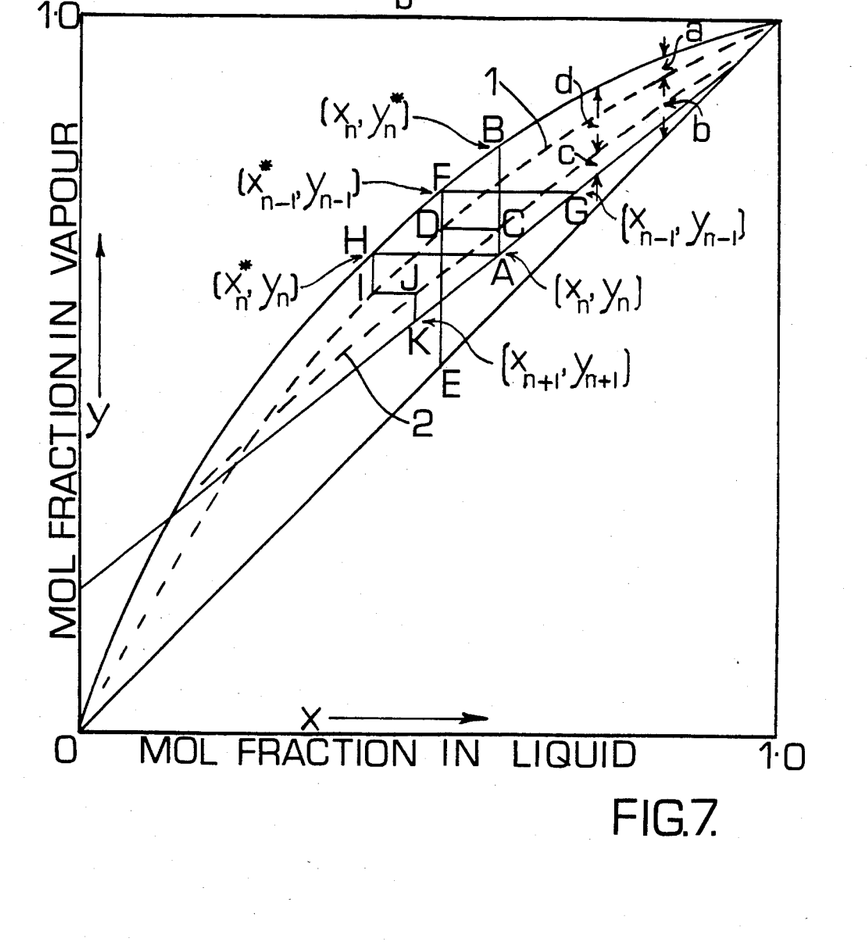
FIG. 7 is a diagram of operation of the still of FIGS. 1 to 3, giving a graphical plate-by-plate analysis.

In FIG. 7 the point A represents the vapour and liquid compositions passing plate n. Since the vapour evaporating from plate n is in equilibrium with the liquid from which it evaporates, point B gives the composition of this vapour $y_n^*$, i.e., B has the co-ordinates $x_n$, $y^*n$.

When the vapours V and v mix to form V+v mols then a mass balance gives $$(V + v)y_n' = vy_n^* + Vy_n$$

$$\text{or } y_n' = \frac{v}{V+v} y_n^* + \frac{V}{V+v} y_n.$$

So point C in FIG. 7 has the co-ordinates $$X_n, y_n', \text{ if } \frac{AC}{CB} = \frac{v}{V} = r.$$

As the vapour passes from plate $P_n$ to plate $P_{n-1}$, v mols of the vapour condense leaving V mols. The liquid condensing from this vapour is in equilibrium with the remaining vapour. Taking a mass balance gives:

$$(V + v)y_n' = vy_n^* + Vy_n$$

or $$y_n' = \frac{v}{V+v} \cdot y_n^* + \frac{V}{V+v} \cdot y_n.$$

Point D in FIG. 7 thus has the co-ordinates $$x^*_{n-1}, y_{n-1} \text{ if } \frac{DF}{DE} = \frac{v}{V} = r.$$

Therefore, drawing FG parallel to the x axis gives point C on the operating line with co-ordinates $x_{n-1}$, $y_{n-1}$.

So by moving from A to C to D to F to G we have moved one plate up the operating line.

If two lines are drawn in the diagram, i.e. lines 1 and 2 in FIG. 7 such that for line 1 $a/b = v/v$ and for line 2 $c/d = v/v$, then the determination of points C and D in the previous procedure is greatly simplified. A whole series of plates can by this means be stepped off graphically with almost as much ease as the use of a McCabe-Thiele diagram for a conventional still. This procedure is illustrated in FIGS. 8 and 9.

Figure 8:
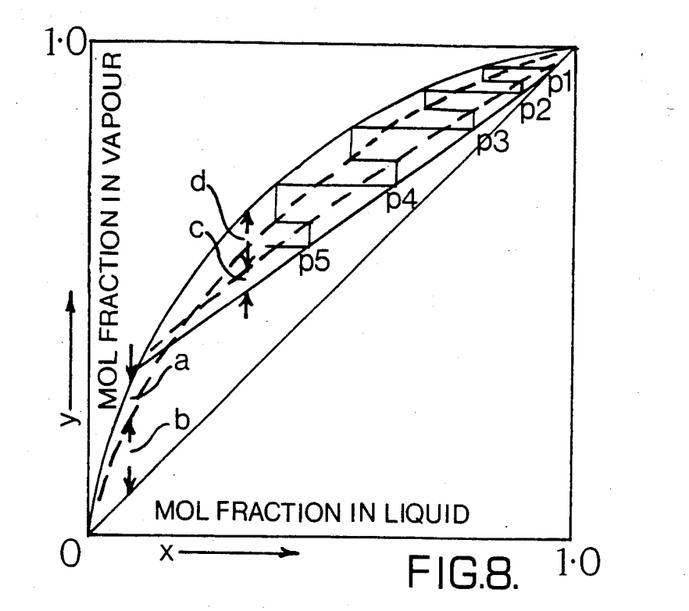
FIGS. 8 and 9 illustrate operation of the still of FIGS. 1 to 3 at low and high condensation ratios respectively.

FIG. 8 illustrates the operation of this type of still with a low value for the ratio v/V, i.e. a relatively low partial condensation and evaporation on each plate $P_1$, $P_2$, $P_3$, $P_4$ and $P_5$. In this FIG. $a/b = v/V$ and also $c/d = v/V$.

Figure 9:
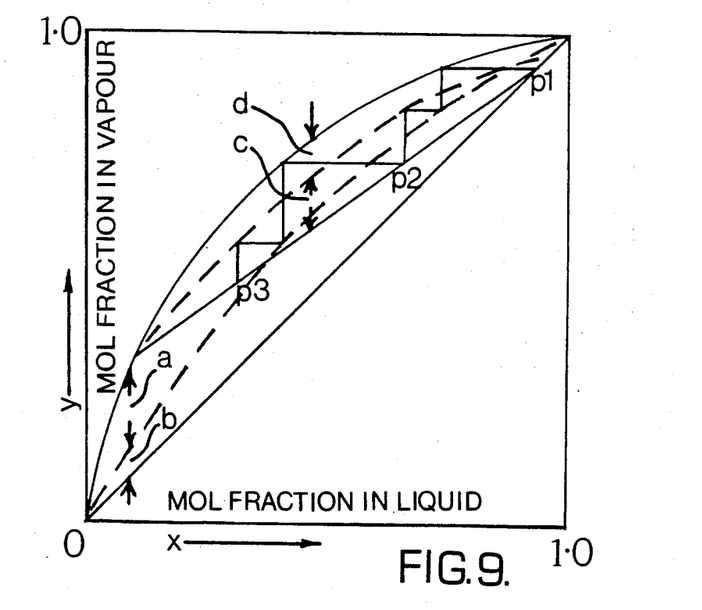

FIG. 9 illustrates operation with a high value for the ratio v/V, i.e. a relatively high partial condensation and evaporation on each plate $P_1$, $P_2$ and $P_3$. Again $a/b = v/V$ and $c/d = v/V$. Examination of FIGS. 8 and 9 shows that a high value of v/V means a very high plate efficiency with a relatively small number of plates required for a particular separation. However, the size of each plate will be relatively large. For any particular case an optimum value for v/V must exist.

In FIG. 7, if the temperature at point H in the diagram is $T(x_n^*, y_n)$ and the temperature at point B is $T(x_n, y_n^*)$, and then the temperature difference across plate $P_n$ is $T(x_n^*, y_n) - T(x_n, y_n^*)$. This temperature difference is the driving force causing the condensation and evaporation on either side of each plate; with most systems this temperature difference will be only a few ° C. if the pressure in the vapour phase is relatively constant throughout the still.

The surface areas required for each plate and, therefore, the total volume of the still will depend on the heat transfer coefficient obtained, the temperature difference and the ratio v/v. A high heat transfer coefficient is imperative if a small volume still with a high production capacity is to be obtained.

The temperature difference across each plate $P_n$ and hence the heat flux and rectification capacity of the plate can be increased by restricting the size of the opening between each plate, thereby increasing the pressure drop in the vapour from plate to plate.

Many variations in the construction of the plates and the still are possible, the preferred design depending on the actual application, but all of them essentially or mainly depend for their operation on the novel principle of countercurrent stepwise condensation and evaporation of vapours and liquids under the effect of centrifugal force causing relatively high heat transfer coefficients and heat fluxes. Some possible but not limiting illustrations in simplified terms of various forms of still are illustrated in FIGS. 10 and in FIGS. 11 and 12.

FIG. 10 illustrates a still with a rotor 201 mounted on a shaft 202 which is rotatable by a motor (not shown). Rotor 201 consists of top and bottom plates 203, 204 respectively on which are mounted series of concentric frusto-conical plates 205, 206; this assembly is surrounded by a peripheral plate 207. The annular space 208 between the innermost plate 209 of the set of plates 205 is used as a boiler, heating being effected by supplying steam via passage 210 through shaft 202 and radially extending pipe 211. Condensate water is recovered by way of radial pipe 212 and passage 213 in shaft 202. Steam is fed to passage 210 via steam inlet 214 and steam box 215 which is provided with appropriate seals against shaft 202 to minimise leakage of steam. Condensate water is recovered from passage 213 in condensate collection box 216, which is also appropriately sealed against shaft 202, and exits the still in line 217. The annular space 218 immediately surrounding shaft 202 within innermost plate 219 of the set of plates 205 forms a condenser. Cooling water from line 220 passes to condenser 218 by way of an appropriately sealed chamber 221 and passage 222 in shaft 202 and is recovered by way of passage 223, sealed chamber 224 and outlet line 225.

Reference numeral 226 indicates a labyrinthine seal between rotor 201 and its housing 227. Further seals 228 and 229 are provided between shaft 202 and housing 227.

Liquid feed mixture is supplied by way of line 230 and orifice 231 to the interior of rotor 201, whilst light volatile vapour product is recovered by way of line 232. Liquid can exit the rotor 201 via peripheral orifices 233 and accumulated heavy, less volatile liquid product is recovered in line 234.

Figure 11:
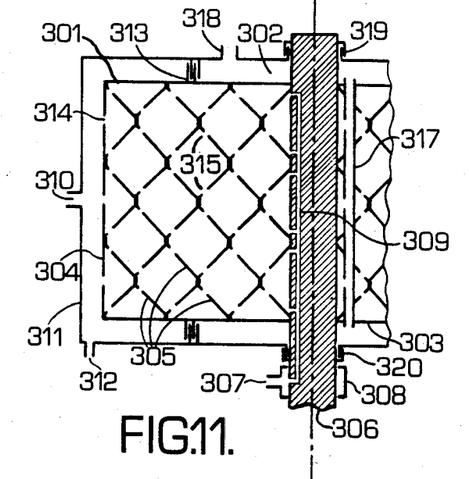
FIG. 11 is a vertical section through a part of a third embodiment of the invention.
Figure 12:
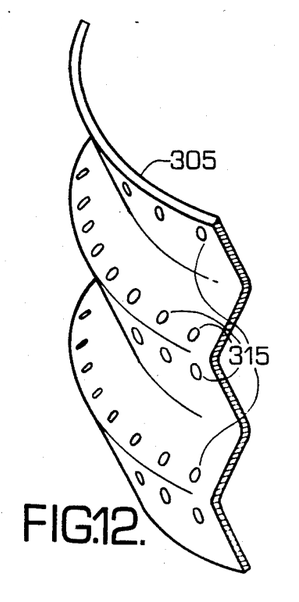
FIG. 12 is a perspective view to an enlarged scale of one of the perforated plates mounted within the rotor of the still of FIG. 11.

In the still of FIGS. 11 and 12 the rotor 301 (only part of which is visible in FIG. 11) consists of top and bottom plates 302, 303 and peripheral plate 304 in which are mounted a plurality of corrugated perforated plates 305. This assembly is mounted on shaft 306 for rotation by a motor (not shown). Liquid reflux material enters the still from a condenser (not shown) by way of inlet 307, inlet box 308, which is appropriately sealed against shaft 306 to minimise leakage, and passage 309 in shaft 306.

Vapour from a boiler (not shown) enters the still via vapour inlet 310. Liquid collecting in the housing 311 of the still is returned to the boiler via line 312. A labyrinthine seal 313 causes at least the majority of the vapour to pass radially inwardly into rotor 301 by way of perforations 314 in the peripheral plate 304. Vapour flows radially inwardly towards the shaft 306, passing through perforations 315 (typically from about 5 mm to about 30 mm in diameter) in the plates 305. Liquid is caused to flow radially outwardly under the influence of centrifugal forces and passes through perforations 315 in the plates 305 to exit the rotor 301 via orifices 314. Vapour is collected at an inner part of the rotor by way of pipe 317 and exits the still via line 318 to the condenser (not shown). Reference numerals 319 and 320 indicate shaft seals.

Some of the advantages inter alia of the still of the invention compared with conventional stationary vertical packed or plate column stills or other rotating packed or plate stills operating under different principles of countercurrent vapour liquid contacting are listed below, but not limited to those advantages.

(1) Very much more compact lower weight units can be designed and employed for a specific duty than other systems.

(2) Very short contact times within the still facilitate the distillation and separation of heat sensitive materials with minimum thermal degradation.

(3) The internal design of the still permits rapid shut down and cleaning or maintenance, and very rapid start up and shut down to facilitate varying production demands.

(4) The plate design of the still permits efficient operation under a wide range of vapour and liquid throughputs and reflux ratios unlike packed columns or stills relying on intimate vapour liquid contact and diffusion processes for rectification which are very dependent for efficient operation on sufficient liquid flow rates to fully wet the packing and on liquid redistribution systems to maintain this wetting uniformly throughout the packing.

(5) The internal design of the still and the effect of the centrifugal force permit it to operate for relatively long periods of time with liquid feeds containing fine particulate or waxy solids, or with viscous liquids, without clogging or binding to a significant degree.

(6) The still can operate normally, even when mounted in a moving or oscillating environment e.g. on shipboard.

What is claimed is:

1. A still for effecting separation of lighter and heavier components of a liquid mixture containing two or more components including a lighter component and a heavier component by multi-stage countercurrent distillation, said still comprising a housing, a hollow rotor rotatably mounted in the housing and having one or more outlets for liquid at the periphery thereof, means for rotating the rotor about its axis, a plurality of concentric lamellar bodies of thermally conductive material mounted in the hollow interior of said rotor so as to provide a labyrinthine path within the rotor both for liquid moving radially outwardly under centrifugal force and also for vapour moving radially inwardly with respect to the rotor in countercurrent to the direction of movement of said liquid, vaporising means for vaporising liquid to be distilled, liquid inlet means for introducing liquid to a radially inner part of the hollow interior of said rotor, vapour outlet means communicating with a radially inner part of the hollow interior of said rotor for removal of vapour enriched in lighter component, and liquid outlet means for removal of liquid enriched in heavier component from the housing, whereby in use vapour is constrained to move radially inwardly and liquid to move radially outwardly along said labyrinthine path under centrifugal force within said rotor in countercurrent one to another, fractionation taking place in a plurality of stages within the rotor and occurring at least in part by condensation of vapour on the radially outer surfaces of said lamellar bodies and by evaporation from liquid on the radially inner surfaces of said lamellar bodies, the heat of condensation resulting from said condensation of vapour on said radially outer surfaces being conducted through said lamellar bodies from the radially outer surfaces thereof to said radially inner surfaces thereof so as to provide heat of evaporation at the radially inner surfaces thereof for said evaporation.

2. A still according to claim 1, in which the ratio of the axial length to the diameter of said rotor is from about 2:1 to about 1:20.

3. A still according to claim 1, in which said lamellar bodies comprise concentric frusto-conical elements mounted within said rotor.

4. A still according to claim 3, in which said lamellar bodies comprise two sets of concentric frusto-conical elements arranged with the direction of tapering being alternately in opposite directions.

5. A still according to claim 3, in which the angle between the axis of each frusto-conical element and its generator is substantially the same.

6. A still according to claim 5, in which the angle between the axis of each frusto-conical element and its generator is form about 15° to about 60°.

7. A still according to claim 1, in which said lamellar bodies comprise concentric perforated elements mounted within said rotor.

8. A still according to claim 7, in which said perforated elements are formed with circumferential corrugations.

9. A still according to claim 1, in which said lamellar bodies comprise concentric cylindrical elements mounted within said rotor.

10. A still according to claim 9, in which said cylindrical elements are arranged alternately in two sets, the elements of one set being fixed to the top of the rotor and those of the other set being fixed to the bottom of the rotor.

11. A still according to claim 1, further including annular boiler means adjacent the radially outermost lamellar body, annular condenser means adjacent the radially innermost lamellar body, means for supplying heating medium to the boiler means, and means for supplying coolant to said condenser means.

12. A still according to claim 1, in which labyrinthine sealing means are provided between the upper and lower faces of the rotor respectively and the housing to prevent substantial vapour and/or liquid flow around the rotor in a radial direction.

13. A multi-stage countercurrent distillation process for separating lighter and heavier components of a liquid mixture which comprises:

(a) supplying the liquid mixture to a radially inner part of the interior of a hollow rotor arranged for rotation about its axis and having a plurality of concentric lamellar bodies of thermally conductive material mounted in the hollow interior thereof so as to provide a labyrinthine path within said rotor for liquid moving radially outwardly and for vapour moving radially inwardly with respedt to said rotor;

(b) rotating said rotor about its axis;

(c) providing vapour at a radially outer part of the hollow interior of said rotor;

(d) allowing liquid to move radially outwardly with respect to said rotor along said labyrinthine path and to undergo evaporation on the radially inner surfaces of said lamellar bodies;

(e) allowing vapour to move radially inwardly with respect to said rotor along said labyrinthine path and to condense on the radially outer surfaces of said lamellar bodies;

(f) permitting heat of condensation resulting from step (e) to be conducted through said lamellar bodies from the radially outer surfaces thereof to provide heat of evaporation for step (d) at the corresponding radially inner surfaces thereof;

(g) allowing vapour enriched in lighter component or components to exit the interior of said rotor from a radially inner part thereof;

(h) recovering vapour of step (g);

(i) allowing liquid enriched in heavier component or components to exit said rotor at the periphery thereof; and (j) recovering liquid of step (i).

* * * * *

UNITED STATES PATENT AND TRADEMARK OFFICE
CERTIFICATE OF CORRECTION

PATENT NO. : 4,597,835

DATED : July 1, 1986

INVENTOR(S) : John Moss

It is certified that error appears in the above-identified patent and that said Letters Patent is hereby corrected as shown below:

In the drawings, Sheet 3, Fig. 6, $o, x_{n+1}$ should be $o, x^*_{n+1}$ $v, y_{n+1}$ should be $v, y^*_{n+1}$ $o, x_n$ should be $o, x^*_n$ $o, x_{n-1}$ should be $o, x^*_{n-1}$ $v, y_{n-1}$ should be $v, y^*_{n-1}$ Column 2, lines 42 through 44 should be cancelled and the following inserted: --rigidity under operating conditions but thin enough to permit high thermal flux from one face to another. Preferably the lamellar bodies are less than about 1mm thick--. Column 8, line 15, the formula "v/v" should be --v/V--.

Signed and Sealed this

Sixth Day of January, 1987

Attest:

DONALD J. QUIGG

Attesting Officer

Commissioner of Patents and Trademarks